(12) United States Patent  
Yamaguchi (10) Patent No.: US 7,760,332 B2
(45) Date of Patent: Jul. 20, 2010

(54) OPTICAL RANGE-FINDING SENSOR, OBJECT DETECTION DEVICE, SELF-CLEANING TOILET SEAT, AND METHOD FOR MANUFACTURING OPTICAL RANGE-FINDING SENSOR

(75) Inventor: Akifumi Yamaguchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 39 days.

(21) Appl. No.: 12/210,497

(22) Filed: Sep. 15, 2008

(65) Prior Publication Data

US 2009/0097010 A1  Apr. 16, 2009

(30) Foreign Application Priority Data

Oct. 12, 2007  (JP) ............................... 2007-266752

(51) Int. Cl.
*G01C 3/00* (2006.01)
*G01C 3/08* (2006.01)
(52) U.S. Cl. ..................... 356/3.06; 356/3.01; 356/4.01
(58) Field of Classification Search ................ 356/3.01, 356/3.06, 4.01, 5.01; 250/559.38
See application file for complete search history.

(56) References Cited

U.S. PATENT DOCUMENTS

| 5,373,344 | A | * | 12/1994 | Kakiuchi | ..................... 396/106 |
| 5,534,991 | A | * | 7/1996 | Maeda et al. | ............... 356/3.06 |
| 6,650,401 | B2 | | 11/2003 | Oka | |
| 7,330,241 | B2 | | 2/2008 | Yamaguchi | |
| 7,417,716 | B2 | | 8/2008 | Nagasaka et al. | |
| 2003/0123044 | A1 | * | 7/2003 | Oka | ............................ 356/3.02 |
| 2004/0089791 | A1 | * | 5/2004 | Fujita | ........................... 250/221 |
| 2005/0184301 | A1 | * | 8/2005 | Nagasaka et al. | ............... 257/96 |
| 2006/0087640 | A1 | * | 4/2006 | Yamaguchi | ................. 356/4.01 |
| 2007/0075280 | A1 | * | 4/2007 | Nakano et al. | .......... 250/559.38 |

FOREIGN PATENT DOCUMENTS

| JP | 63-198817 | | 8/1988 |
| JP | 9-318315 | | 12/1997 |
| JP | 10-153425 | A | 6/1998 |
| JP | 2003-50127 | A | 2/2003 |
| JP | 2003-202205 | A | 7/2003 |
| JP | 2005-156424 | A | 6/2005 |
| JP | 2005-241340 | A | 9/2005 |
| JP | 2006-125862 | A | 5/2006 |
| JP | 2006-153730 | A | 6/2006 |
| JP | 2006-153814 | A | 6/2006 |
| JP | 2006-163814 | A | 6/2006 |
| JP | 2006153730 | A | * | 6/2006 |

* cited by examiner

*Primary Examiner*—Isam Alsomiri
(74) *Attorney, Agent, or Firm*—Nixon & Vanderhye P.C.

(57) ABSTRACT

An optical range-finding sensor includes a light-emitting element that emits irradiation light, a light-emitting side lens that collects the irradiation light and irradiates the light to a range-finding object, a light-receiving side lens that collects reflected light of the irradiation light reflected by the range-finding object, a position detecting light-receiving element that receives the collected reflected light and detects a position of the range-finding object, and a control processing integrated circuit that controls light emission of the light-emitting element and processes a detection current of the position detecting light-receiving element. The light-emitting element is configured of a vertical cavity surface emitting laser.

13 Claims, 8 Drawing Sheets

OPTICAL RANGE-FINDING SENSOR, OBJECT DETECTION DEVICE, SELF-CLEANING TOILET SEAT, AND METHOD FOR MANUFACTURING OPTICAL RANGE-FINDING SENSOR

This application claims priority under 35 U.S.C. §119(a) on Japanese Patent Application No. 2007-266752 filed in Japan on Oct. 12, 2007, the entire contents of which are hereby incorporated by reference.

BACKGROUND

1. Field of the Technology

The technology presented herein relates to an optical range-finding sensor that detects the distance to a range-finding object, an object detection device and a self-cleaning toilet seat that employ the optical range-finding sensor, and a method for manufacturing such an optical range-finding sensor.

2. Description of the Related Art

Optical range-finding sensors are known in which irradiation light is irradiated from a light-emitting element to a range-finding object, the position of light reflected by the range-finding object is detected by a position detecting light-receiving element, and the distance to the range-finding object is measured by a triangulation technique.

Figure 7A:
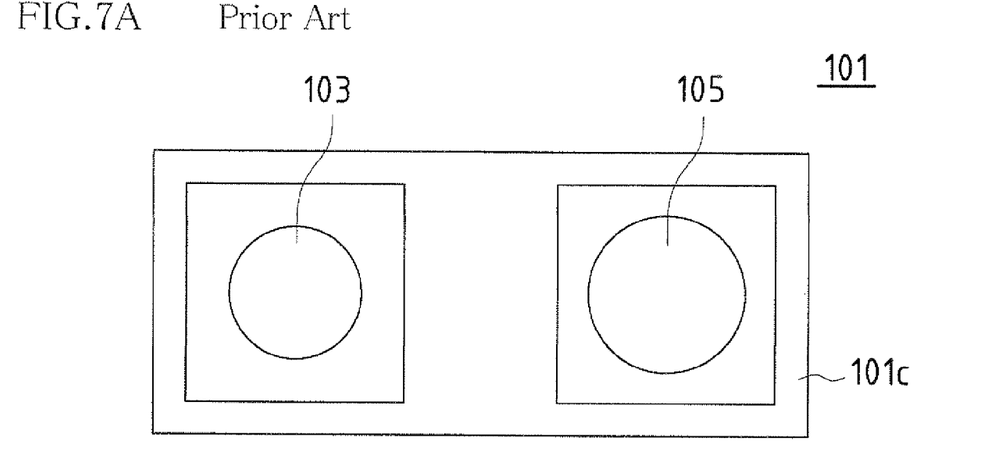
FIG. 7A is a plan view conceptually illustrating the schematic structure and action of a conventional optical range-finding sensor.
Figure 7B:
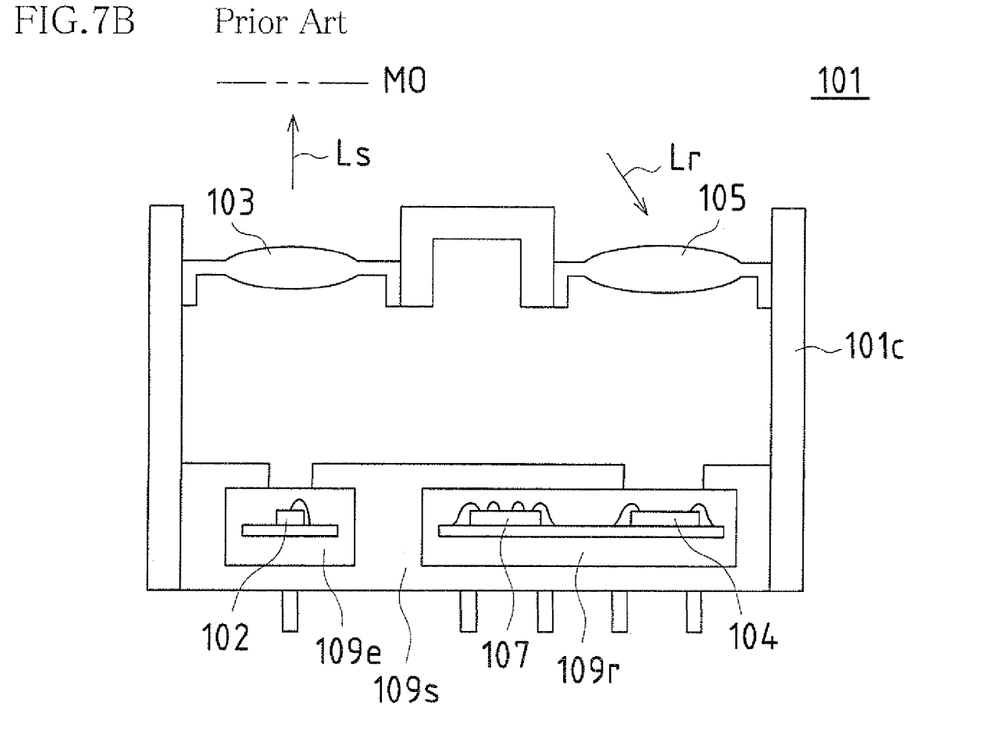
FIG. 7B is a see-through side view conceptually illustrating the schematic structure and action of the conventional optical range-finding sensor.

FIGS. 7A and 7B are diagrams conceptually illustrating the schematic structure and action of a conventional optical range-finding sensor FIG. 7A is a plan view, and FIG. 7B is a see-through side view.

Figure 8:
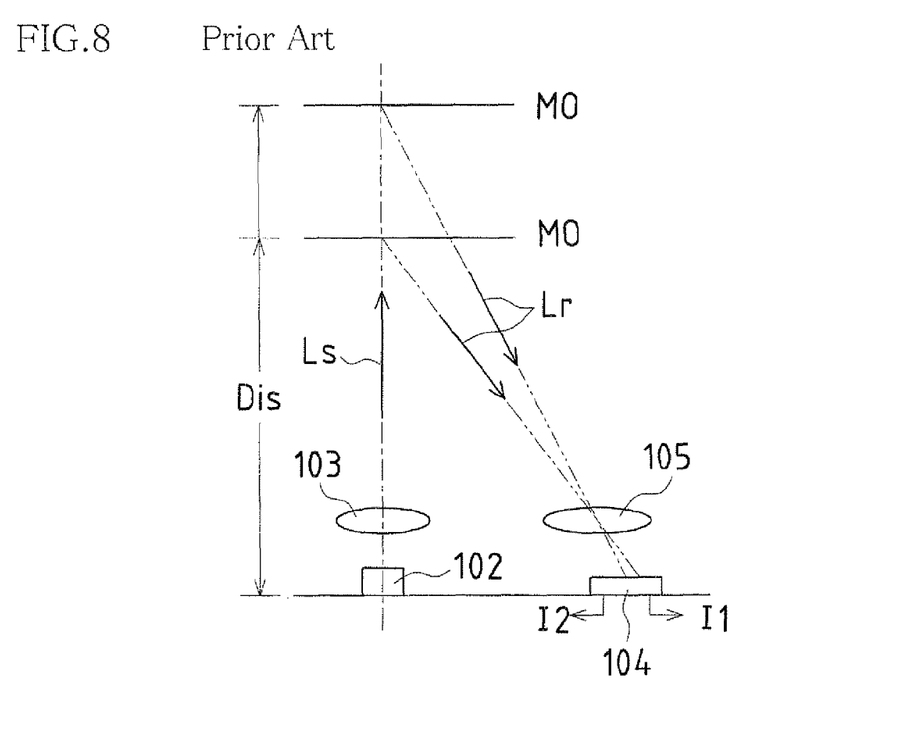
FIG. 8 is a conceptual diagram for illustrating the concept of triangulation technique with the conventional optical range-finding sensor.

FIG. 8 is a conceptual diagram for illustrating the concept of triangulation technique with a conventional optical range-finding sensor.

A conventional optical range-finding sensor 101 includes a light-emitting element 102 that emits irradiation light Ls, a light-emitting side lens 103 that collects the irradiation light Ls and irradiates the light to a range-finding object MO, a light-receiving side lens 105 that collects reflected light Lr that is the irradiation light Ls reflected by the range-finding object MO, a position detecting light-receiving element 104 (PSD: Position Sensitive Detector) that receives the collected reflected light Lr and detects the position of the range-finding object MO, and a control processing integrated circuit 107 that controls light emission of the light-emitting element 102 and processes detection currents I1 and I2 from the position detecting light-receiving element 104.

Irradiation light Ls is reflected by the range-finding object MO and turns into reflected light Lr. The reflected light Lr forms a light spot on the light-receiving face of the position detecting light-receiving element 104, and the light spot is detected in the form of detection currents I1 and I2 from the output terminals of the position detecting light-receiving element 104.

The conventional light-emitting element 102 is configured of a semiconductor light-emitting diode (LED: Light Emitting Diode). Because a semiconductor light-emitting diode radiates irradiation light Ls in all directions of the element, in order to irradiate a necessary amount of irradiation light Ls to the range-finding object MO, it is necessary to increase the amount of light emitted from the light-emitting element 102 (the amount of irradiation light Ls) to increase the efficacy of the light-emitting side lens 103.

Specifically, the focal distance and diameter of the light-emitting side lens 103 are made very large so as to collect irradiation light Ls emitted from the semiconductor light-emitting diode. In addition to increasing the diameter of the light-emitting side lens 103 such that the position detecting light-receiving element 104 obtains the amount of light necessary for range finding, it is necessary to increase the product obtained by multiplying the forward current of the semiconductor light-emitting diode when driven by pulses by light-emitting time.

Furthermore, as mentioned above, because a semiconductor light-emitting diode radiates irradiation light Ls in all directions of the element, it was impossible to incorporate the diode with the position detecting light-receiving element 104 and the control processing integrated circuit 107 in the same light-transmitting resin sealed package.

That is, a light-transmitting resin sealed package 109e in which the light-emitting element 102 is sealed with resin and a light-transmitting resin sealed package 109r in which the position detecting light-receiving element 104 and the control processing integrated circuit 107 are sealed with resin are formed separately, the light-transmitting resin sealed packages 109e and 109r are connected/combined with a light-shielding resin sealed package 109s formed of a light-shielding resin, and after that, the resultant is fitted to a sensor case 101c.

Figure 9:
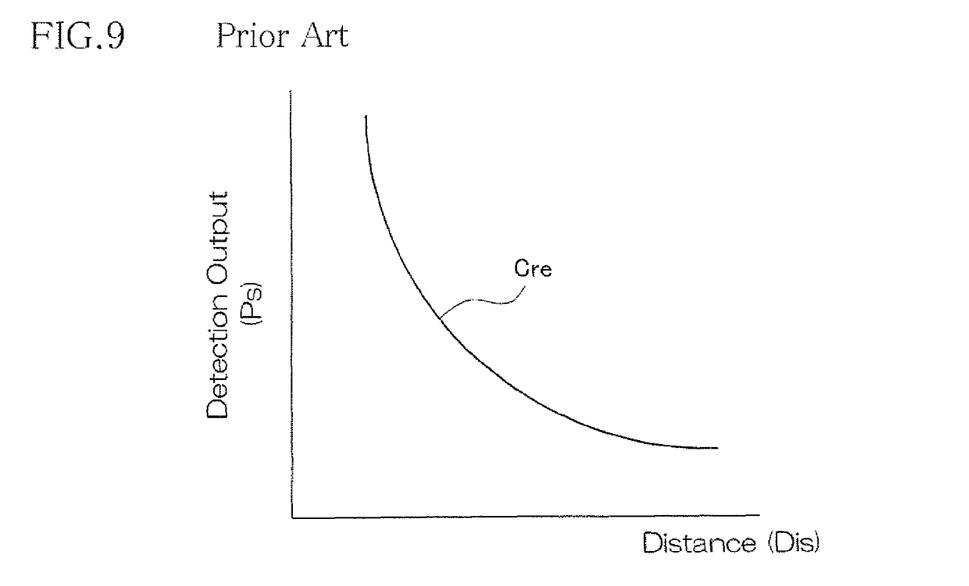
FIG. 9 is a characteristic graph conceptually illustrating a state of detection output versus a distance to a range-finding object detected by a position detecting light-receiving element of the conventional optical range-finding sensor.

FIG. 9 is a characteristic graph conceptually illustrating the state of detection output versus the distance to the range-finding object detected by the position detecting light-receiving element of the conventional optical range-finding sensor.

Reflected Light Lr forms a light spot on a different position on the position detecting light-receiving element 104 depending on the position of the range-finding object MO, changing the detection currents I1 and I2. For this reason, a configuration is employed in which the distance Dis from the optical range-finding sensor 101 to the range-finding object MO is detected by detecting a detection output Ps (see FIG. 9) that is defined by Detection output Ps=Detection current I1/(Detection current I1+Detection current I2).

Because the conventional position detecting light-receiving element 4 has a single light-receiving face (light-receiving region) and the resistance value of the light-receiving region is uniform, the detection output Ps is inversely proportional to the distance Dis, and so the correlation characteristic Cre exhibits an inversely proportional curve, which means it is difficult to measure the distance to the range-finding object MO with high accuracy.

Figure 10:
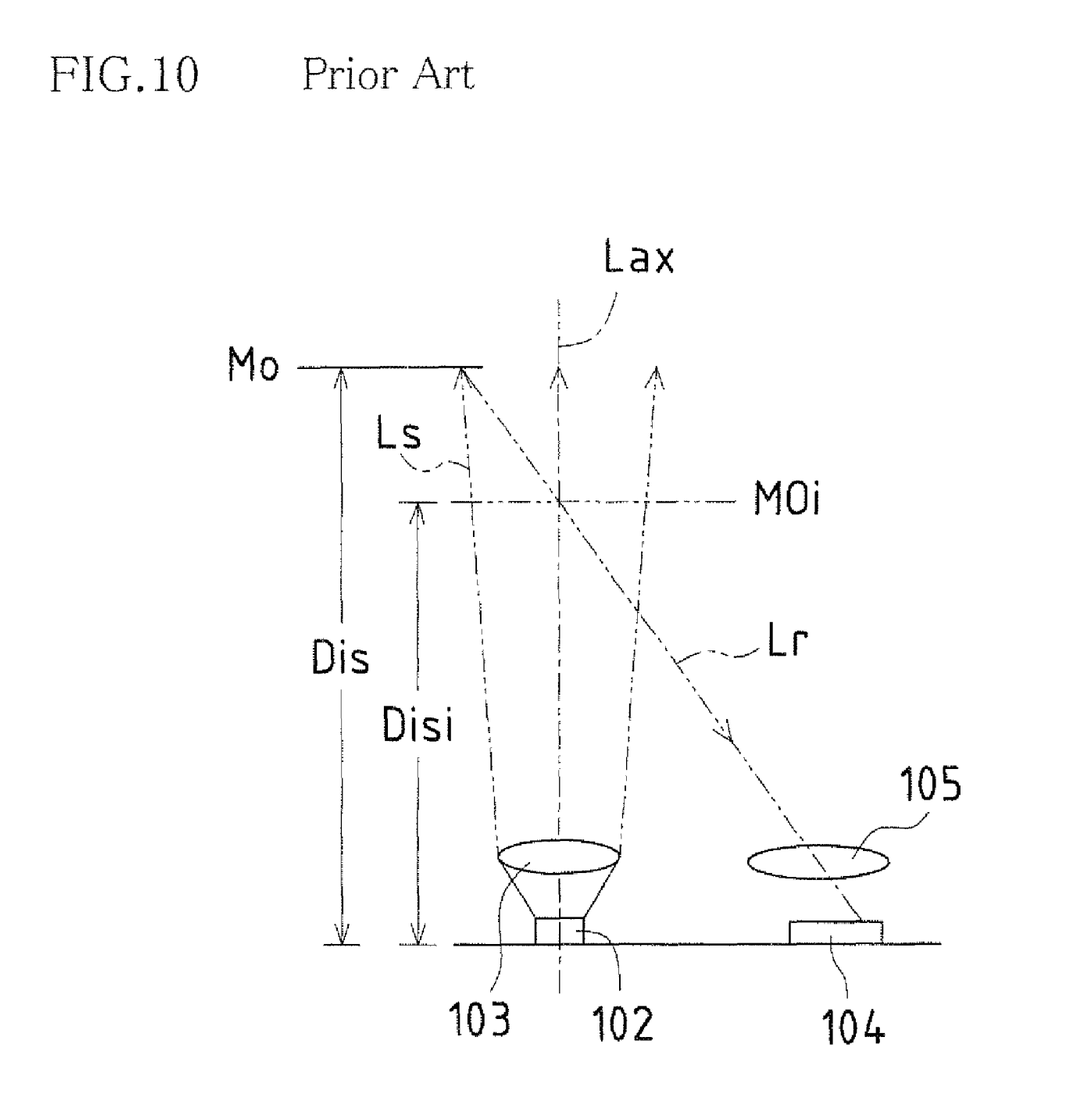
FIG. 10 is a diagram for illustrating the occurrence of errors in range finding that are caused by spread of light irradiated from a light-emitting element of the conventional optical range-finding sensor.

FIG. 10 is a diagram for illustrating the occurrence of errors in range finding that are caused by the spread of light irradiated from the light-emitting element of the conventional optical range-finding sensor.

It is configured such that irradiation light Ls from the light-emitting element 102 (semiconductor light-emitting diode) is collected by the light-emitting side lens 103 to collimate the light, but because the semiconductor light-emitting diode is not a point light source, the irradiation light Ls spreads to some extent.

For example, if the range-finding object MO is outside on the side opposite to the position detecting light-receiving element 104 with respect to the sensor optical axis Lax that is defined by the light-emitting element 102 and the light-emitting side lens 103, the position of a light spot formed by the reflected light Lr reflected by the range-finding object MO that enters the position detecting light-receiving element 104 is detected as the position corresponding to a range-finding object MOi located at a distance Disi that is closer than the original distance Dis, causing a range finding error.

As described above, the conventional optical range-finding sensor 101 employs a semiconductor light-emitting diode as the light-emitting element 102. Because of this, the amount of irradiation light Ls in the direction of the range-finding object MO that is necessary for range finding is small. Accordingly, measures had to be taken to achieve the amount of light necessary for range finding, such as increasing the focal distance and diameter of the light-emitting side lens 103 as well as increasing the product obtained by multiplying the forward current of the semiconductor light-emitting diode when driven by pulses by light-emitting time.

Furthermore, it was also necessary to dispose a light-shielding resin sealed package 109s (light-shielding portion) for shielding the light-transmitting resin sealed package 109r in which the position detecting light-receiving element 104 was sealed from light emitted from the light-transmitting resin sealed package 109e in which the light-emitting element 102 was sealed, making it difficult to reduce the size of the optical range-finding sensor 101 (sensor case 101c).

When measuring the distance to a black range-finding object MO that is located at a distant position, the measuring accuracy lowers due to an insufficient amount of irradiation light Ls.

Optical range-finding sensors that employ a position detecting light-receiving element as disclosed in, for example, JP H9-318315A and JP S63-198817A are known.

SUMMARY

The example embodiment presented herein has been conceived in light of the above circumstances, and it is a feature of the present embodiment to provide an optical range-finding sensor including a light-emitting element that emits irradiation light, a light-emitting side lens, a light-receiving side lens, a position detecting light-receiving element that receives reflected light and detects the position of a range-finding object, and a control processing integrated circuit that controls light emission of the light-emitting element and processes a detection current of the position detecting light-receiving element, wherein reductions in size, power consumption and cost and increased accuracy can be achieved by using a vertical cavity surface emitting laser as the light-emitting element.

It is another feature of the present embodiment to provide an object detection device that detects the presence of an object to be detected using an optical range-finding sensor, wherein the presence of a range-finding object can be detected with high accuracy and a size reduction can be achieved by configuring the optical range-finding sensor with the optical range-finding sensor of the present embodiment.

It is another feature of the present embodiment to provide a self-cleaning toilet seat that detects the utilization status of the seat with an object detection device and performs a cleaning preparation, that can function with high accuracy, is easy to use and has a superior design by configuring the object detection device with the object detection device of the present embodiment.

It is another feature of the present embodiment to provide a method for manufacturing an optical range-finding sensor that can readily provide a compact and highly accurate optical range-finding sensor, in which a light-transmitting resin sealed package is formed by sealing a light-emitting element, a position detecting light-receiving element and a control processing integrated circuit collectively with a light-transmitting sealing resin, and the light-transmitting resin sealed package is fitted to a sensor case that has a light-emitting side lens and a light-receiving side lens, thereby the light-emitting side lens, the light-receiving side lens and the light-transmitting resin sealed package are positioned and coupled with high accuracy.

An optical range-finding sensor according to the present embodiment includes a light-emitting element that emits irradiation light, a light-emitting side lens that collects the irradiation light and irradiates the light to a range-finding object, a light-receiving side lens that collects reflected light of the irradiation light reflected by the range-finding object, a position detecting light-receiving element that receives the collected reflected light and detects a position of the range-finding object, and a control processing integrated circuit that controls light emission of the light-emitting element and processes a detection current of the position detecting light-receiving element, wherein the light-emitting element is a vertical cavity surface emitting laser.

With this configuration, irradiation light having high directivity can be irradiated to the range-finding object, and reflected light having high directivity can be received from the range-finding object. Thus, the amount of light sufficient for range finding can be secured with a small driving current, and the position detection accuracy of the position detecting light-receiving element can be improved while reducing the size of the optical system, providing a compact optical range-finding sensor that has superior range-finding characteristics. In other words, an optical range-finding sensor wherein reductions in size, power consumption and cost and increased accuracy are possible can be obtained.

In the optical range-finding sensor of the present embodiment, the light-emitting element, the position detecting light-receiving element and the control processing integrated circuit may be sealed in a single light-transmitting resin sealed package.

This configuration eliminates the need to provide a light-shielding portion between the light-emitting element and the position detecting light-receiving element, which improves the mounting density of the light-emitting element, the position detecting light-receiving element and the control processing integrated circuit, and it is therefore possible to provide a compact optical range-finding sensor.

In the optical range-finding sensor of the present embodiment, the light-emitting element, the position detecting light-receiving element and the control processing integrated circuit may be mounted on a lead frame.

With this configuration, the mounting structure can be simplified, and it is therefore possible to provide an optical range-finding sensor that is highly reliable and can be manufactured at low cost.

In the optical range-finding sensor of the present embodiment, the light-transmitting resin sealed package may be fitted to a sensor case that holds the light-emitting side lens and the light-receiving side lens.

With this configuration, the light-emitting side lens, the light-receiving side lens, and the light-transmitting resin sealed package can be positioned and coupled with high accuracy. Accordingly, size reduction and increased accuracy are easily achieved.

In the optical range-finding sensor of the present embodiment, the position detecting light-receiving element may be divided into a plurality of light-receiving regions having equal areas, and number of the divided light-receiving regions and resistance values of the light-receiving regions may be set such that correlation characteristic between a distance to the range-finding object and a detection output of the position detecting light-receiving element becomes linear.

With this configuration, even if a distance to the range-finding object is large, the change of the detection output to the change of the distance can be increased. Accordingly, even if the spacing between the light-emitting element and the position detecting light-receiving element is reduced, it is possible to measure long distances with high accuracy.

In the optical range-finding sensor of the present embodiment, the number of the divided light-receiving regions may be 3 or greater.

This configuration can ensure that the correlation characteristic between the distance to the range-finding object and the detection output of the position detecting light-receiving element becomes linear.

In the optical range-finding sensor of the present embodiment, a directional angle of the vertical cavity surface emitting laser may be 5 to 25 degrees.

With this configuration, it is possible to sufficiently collect irradiation light to the range-finding object that is far away while reducing the size of the light-emitting side lens, and it is therefore possible to provide a compact and highly accurate optical-range finding sensor.

In the optical range-finding sensor of the present embodiment, a focal distance of the light-emitting side lens may be 1 to 4 mm.

With this configuration, both size reduction and increased accuracy can be achieved.

In the optical range-finding sensor of the present embodiment, a diameter of the light-emitting side lens may be 0.5 to 2 mm.

With this configuration, both size reduction and increased accuracy can be achieved.

In the optical range-finding sensor of the present embodiment, a wavelength of light emitted from the vertical cavity surface emitting laser may be a wavelength in an infrared region.

With this configuration, the influence of noise from visible light can be eliminated, and it is therefore possible to perform highly accurate and highly reliable range finding.

In the optical range-finding sensor of the present embodiment, the vertical cavity surface emitting laser may be driven by pulses, and the control processing integrated circuit may be configured to process the detection current from the position detecting light-receiving element by adjusting a product of a forward current of the vertical cavity surface emitting laser and emission time.

With this configuration, irradiation light that corresponds to the distance to the range-finding object can be emitted, and detectable reflected light can be obtained.

The object detection device of the present embodiment is an object detection device that detects presence of an object to be detected by employing an optical range-finding sensor, wherein the optical range-finding sensor is the optical range-finding sensor of the present invention.

With this configuration, it is possible to provide a compact object detection device that can detect the presence of an object to be detected with high accuracy.

The self-cleaning toilet seat according to the present embodiment is a self-cleaning toilet seat that detects a utilization status of the seat with an object detection device and performs a cleaning preparation, wherein the object detection device is the object detection device of the present embodiment.

With this configuration, it is possible to provide a self-cleaning seat that can function with high accuracy, is easy to use and has a superior design.

The method for manufacturing an optical range-finding sensor according to the present embodiment is a method for manufacturing an optical range-finding sensor including a light-emitting element that emits irradiation light, a light-emitting side lens that collects the irradiation light and irradiates the light to a range-finding object, a light-receiving side lens that collects reflected light of the irradiation light reflected by the range-finding object, a position detecting light-receiving element that receives the collected reflected light and detects a position of the range-finding object, and a control processing integrated circuit that controls light emission of the light-emitting element and processes a detection current of the position detecting light-receiving element, the method involving: a lead frame preparation step of preparing a lead frame for mounting the light-emitting element, the position detecting light-receiving element and the control processing integrated circuit; an element mounting step of mounting the light-emitting element, the position detecting light-receiving element and the control processing integrated circuit on the lead frame; a package forming step of forming a light-transmitting resin sealed package by sealing the light-emitting element, the position detecting light-receiving element and the control processing integrated circuit collectively with a light-transmitting sealing resin; and a package fitting step of fitting the light-transmitting resin sealed package to a sensor case that includes the light-emitting side lens and the light-receiving side lens.

With this configuration, the light-emitting side lens, the light-receiving side lens, and the light-transmitting resin sealed package can be positioned and coupled with high accuracy, and it is thus possible to readily form an optical range-finding sensor in which size reduction and increased accuracy are possible.

DESCRIPTION OF THE PREFERRED EMBODIMENTS

Hereinafter, embodiments will be described in detail with reference to the accompanying drawings.

Embodiment 1

An optical range-finding sensor according to Embodiment 1 invention and a method for manufacturing the same will be described with reference to FIGS. 1A to 5.

Figure 1A:
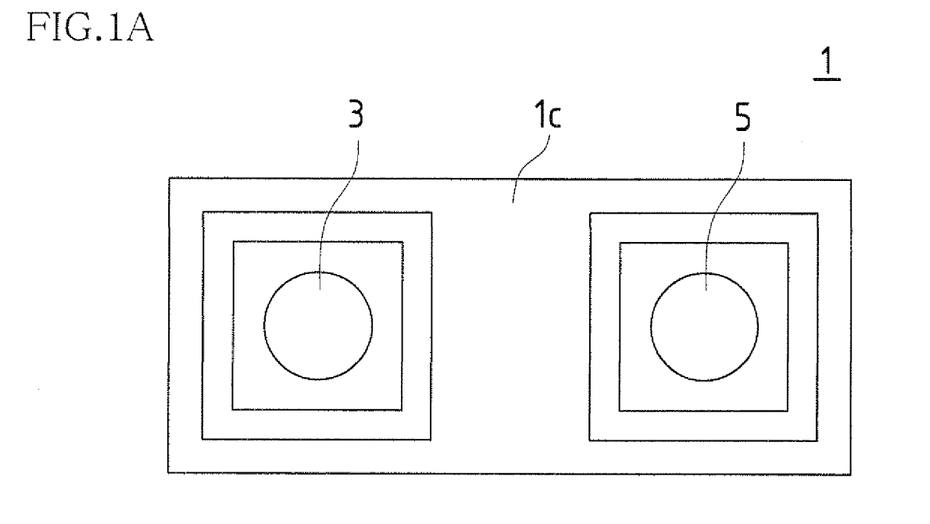
FIG. 1A is a plan view conceptually illustrating the schematic structure and action of an optical range-finding sensor according to Embodiment 1.
Figure 1B:
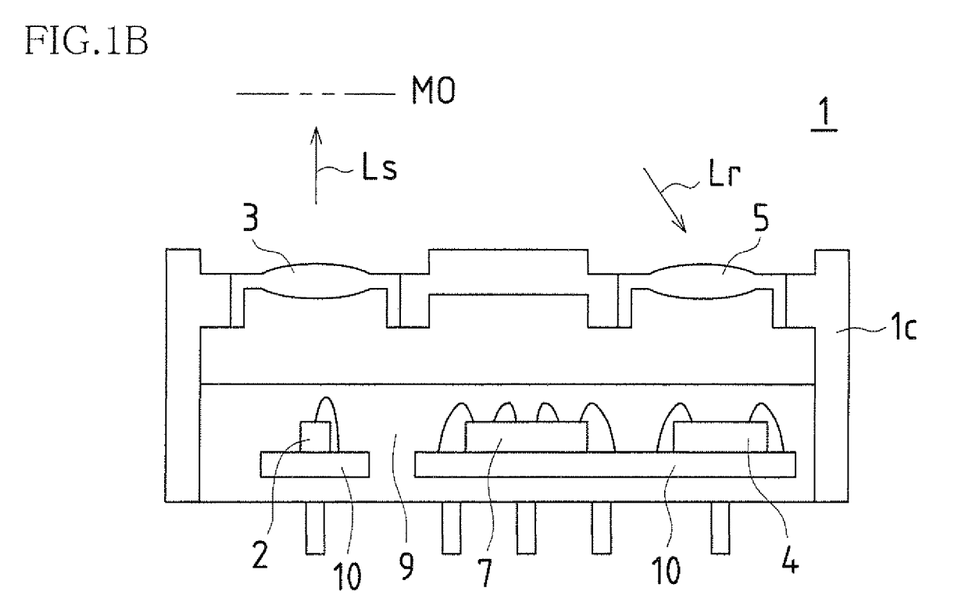
FIG. 1B is a see-through side view conceptually illustrating the schematic structure and action of the optical range-finding sensor according to Embodiment 1.

FIGS. 1A and 1B are diagrams conceptually illustrating the schematic structure and action of an optical range-finding sensor according to Embodiment 1 of the present invention. FIG. 1A is a plan view, and FIG. 1B is a see-through side view.

The optical range-finding sensor 1 according to the present embodiment includes a light-emitting element 2 that emits irradiation light Ls, a light-emitting side lens 3 that collects the irradiation light Ls and irradiates the light to a range-finding object MO, a light-receiving side lens 5 that collects reflected light Lr of the irradiation light Ls reflected by the range-finding object MO, a position detecting light-receiving element 4 (PSD: Position Sensitive Detector) that receives the collected reflected light Lr and detects a position of the range-finding object MO, and a control processing integrated circuit 7 that controls light emission of the light-emitting element 2 and processes detection currents I1 and I2 (see FIG. 3) from the position detecting light-receiving element 4.

The light-emitting element 2, the light-emitting side lens 3, the position detecting light-receiving element 4, the light-receiving side lens 5 and the control processing integrated circuit 7 are housed in a sensor case 1c. This can improve the structural strength and can eliminate any external influence, and so highly accurate range-finding characteristics can be obtained.

In the present embodiment, the light-emitting element 2 is configured of a vertical cavity surface emitting laser (VCSEL). Accordingly, because irradiation light Ls having high directivity can be irradiated to the range-finding object MO and reflected light Lr having high directivity can be received from the range-finding object MO, the amount of light sufficient for range finding can be secured with a small driving current and the position detection accuracy of the position detecting light-receiving element 4 can be improved while reducing the size of the optical system, and it is therefore possible to provide an optical range-finding sensor 1 that is compact and has superior range-finding characteristics.

The light-emitting element 2, the position detecting light-receiving element 4 and the control processing integrated circuit 7 are sealed in a single light-transmitting resin sealed package 9.

In the present embodiment, a vertical cavity surface emitting laser is used as the light-emitting element 2, instead of using a conventional semiconductor light-emitting diode (LED). Accordingly, irradiation light Ls has high directivity and thus is not irradiated in all directions from the element. In other words, even when the light-emitting element 2 is sealed with the position detecting light-receiving element 4 in the same light-transmitting resin, irradiation light Ls emitted from the vertical cavity surface emitting laser does not directly enter the position detecting light-receiving element 4.

Because it is unnecessary to provide a light-shielding portion between the light-emitting element 2 and the position detecting light-receiving element 4, the mounting density of the light-emitting element 2, the position detecting light-receiving element 4 and the control processing integrated circuit 7 can be improved. It is therefore possible to manufacture a compact optical range-finding sensor 1 with high productivity at low cost.

The light-emitting element 2, the position detecting light-receiving element 4 and the control processing integrated circuit 7 are mounted on a lead frame 10. Because the mounting structure can be simplified, it is possible to provide an optical range-finding sensor 1 that is highly reliable and can be manufactured at low cost. The light-emitting element 2, the position detecting light-receiving element 4 and the control processing integrated circuit 7 are mounted (by die bonding, wire bonding) on the lead frame 10 in which a predetermined pattern is laid out, and after that, the lead frame 10 is mounted in a single light-transmitting resin sealed package 9. The light-transmitting resin sealed package 9 can be formed using a transfer mold.

The light-transmitting resin sealed package 9 is fitted to the sensor case 1c that holds the light-emitting side lens 3 and the light-receiving side lens 5. Accordingly, the light-transmitting resin sealed package 9 can be positioned with respect to the light-emitting side lens 3 and the light-receiving side lens 5 with high accuracy, and therefore size reduction and increased accuracy are easily achieved. An adhesive may be used when fitting the light-transmitting resin sealed package 9 to the sensor case 1c.

The light-emitting side lens 3 and the light-receiving side lens 5 are formed simultaneously by integrally molding the sensor case 1c by two color molding. In other words, the sensor case 1c serves also as a lens case that includes the light-emitting side lens 3 and the light-receiving side lens 5.

The light-emitting side lens 3 and the light-receiving side lens 5 are formed of a material that blocks visible light, and so even if visible light such as ambient light is irradiated, it does not affect the position detecting light-receiving element 4. A portion of the sensor case 1c other than the light-emitting side lens 3 and the light-receiving side lens 5 is formed of a material that blocks both visible light and infrared light.

A wavelength of light emitted from the light-emitting element 2 (vertical cavity surface emitting laser) is set to a wavelength in the infrared range (e.g., about 0.75 to 1 µm). This can eliminate the influence of noise from visible light, and it is therefore possible to perform highly accurate and highly reliable range finding. Furthermore, the position detecting light-receiving element 4 has the peak sensitivity of the wavelength of received light in the infrared range so as to correspond to the wavelength of emitting light of the light-emitting element 2. In other words, noise from visible light can be eliminated both at the light-emitting side and the light-receiving side, and it is therefore possible to provide a highly accurate and highly reliable optical range-finding sensor 1.

With the optical range-finding sensor 1, a triangle is formed by the light-emitting element 2 (light-emitting side lens 3), the range-finding object MO and the position detecting light-receiving element 4 (light-receiving side lens 5), and it is therefore possible to perform what is called triangulation range finding (distance detection) by using the detection currents I1 and I2 (see FIG. 3) from the position detecting light-receiving element 4, which are values corresponding to the position of reflected light Lr (the position of the light spot) detected by the position detecting light-receiving element 4.

Figure 2:
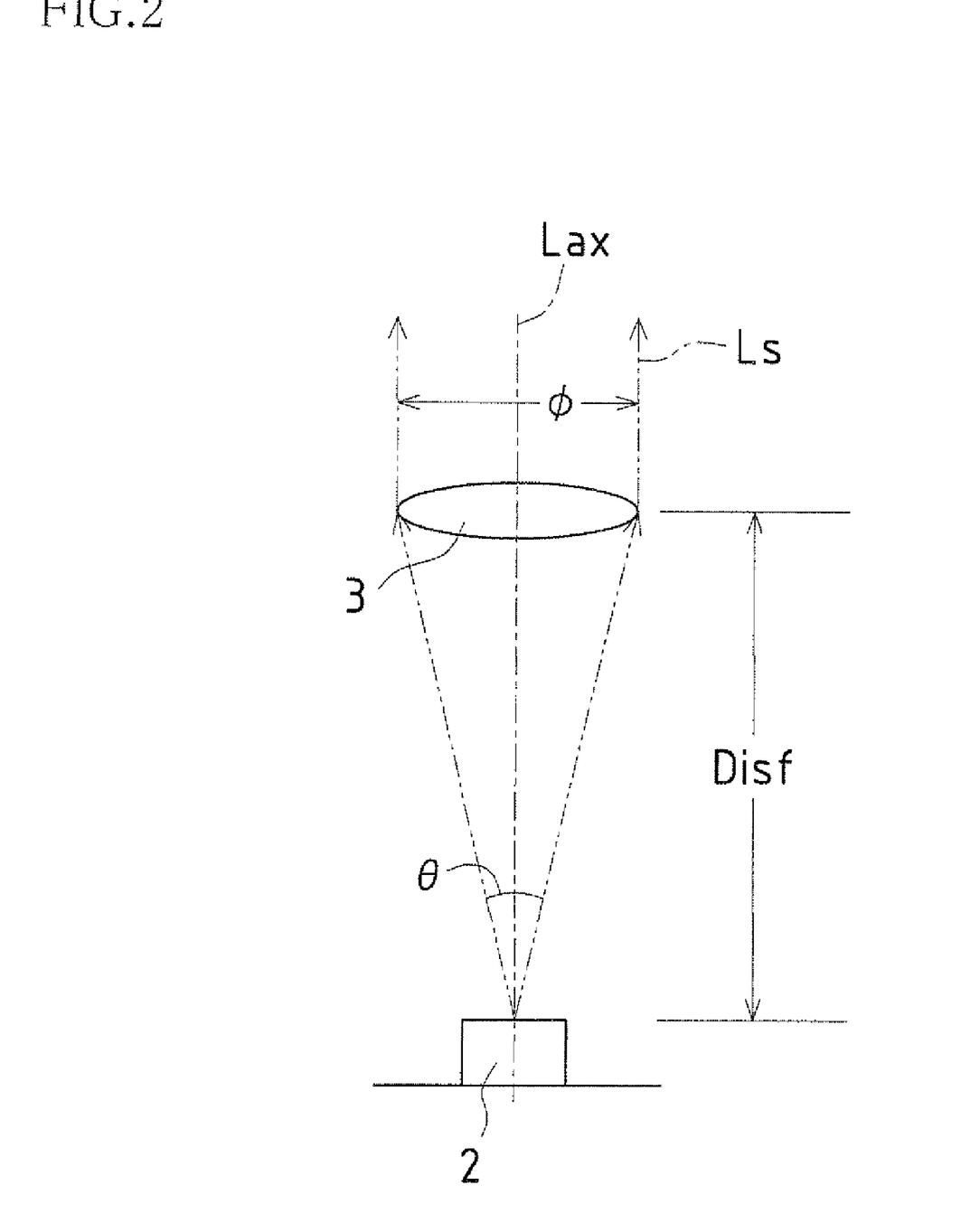
FIG. 2 is a diagram conceptually illustrating the schematic structure and action of a light-emitting element and a light-emitting side lens of the optical range-finding sensor according to Embodiment 1.

FIG. 2 is a diagram conceptually illustrating the schematic structure and action of the light-emitting element and the light-emitting side lens of the optical range-finding sensor according to Embodiment 1 of the present invention.

It is preferable that a directional angle θ of the vertical cavity surface emitting laser (light-emitting element 2) of the present embodiment is set to 5 to 25 degrees with the sensor optical axis Lax that is defined by the light-emitting element 2 and the light-emitting side lens 3 at the center.

In other words, by setting the directional angle θ of the vertical cavity surface emitting laser (light-emitting element 2) within a range from 5 to 25 degrees, irradiation light Ls to the range-finding object MO that is far away can be collected sufficiently while reducing the size of the light-emitting side lens 3, and it is therefore possible to provide a compact and highly accurate optical range-finding sensor 1.

The reason for limiting the directional angle θ by setting the upper and lower limits is as follows. If the directional angle θ is smaller than 5 degrees, the beam of irradiation light Ls will be too thin, which may cause unexpected influence on the range-finding object MO, or a problem may arise that highly accurate positioning to the range-finding object MO has to be performed. Conversely, if the directional angle θ is greater than 25 degrees, the beam of irradiation light Ls will be too thick, and the distribution (the position at which light is collected) of reflected light Lr reflected by the range-finding object MO may vary, making it difficult to achieve highly accurate range finding.

It is preferable that a focal distance Disf of the light-emitting side lens 3 is set to 1 to 4 mm.

In other words, by setting the focal distance Disf of the light-emitting side lens 3 to correspond to the directional angle θ of the light-emitting element 2, both size reduction and increased accuracy can be achieved in the optical range-finding sensor 1.

It is preferable that a diameter φ of the light-emitting side lens 3 is set to 0.5 to 2 mm.

In other words, by setting the diameter φ of the light-emitting side lens 3 to correspond to the directional angle θ of the light-emitting element 2 and the focal distance Disf of the light-emitting side lens 3, both size reduction and increased accuracy can be achieved in the optical range-finding sensor 1.

The directional angle θ can be set by selecting the light-emitting element 2 (vertical cavity surface emitting laser). The focal distance Disf and the diameter φ can be optically adjusted as appropriate based on the directional angle θ. By setting these to the above-described values, irradiation light Ls irradiated from the light-emitting side lens 3 to the range-finding object MO can be formed into parallel light, and therefore size 6 reduction and increased accuracy are easily achieved.

Figure 3:
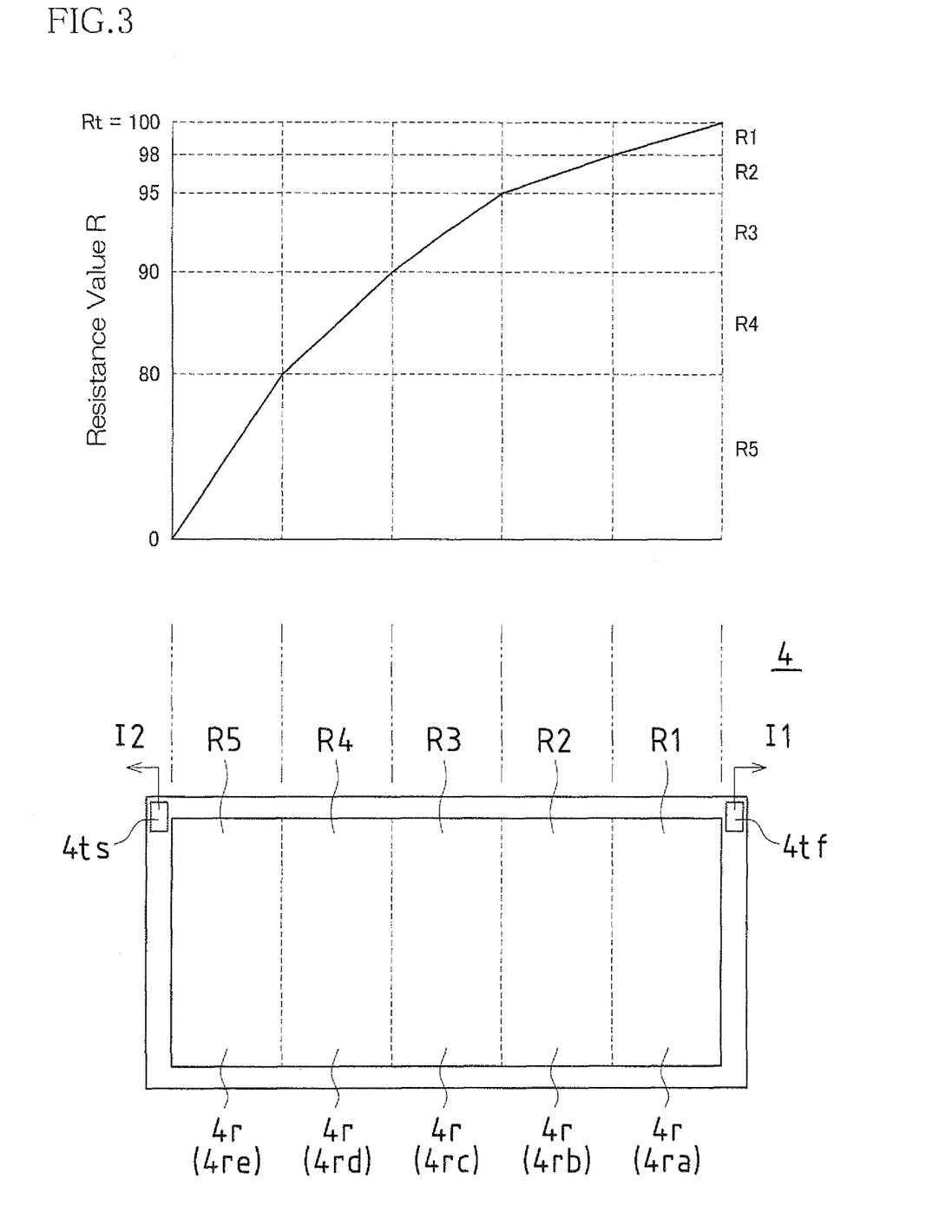
FIG. 3 shows diagrams conceptually illustrating the schematic planar structure and action of a position detecting light-receiving element of the optical range-finding sensor according to Embodiment 1.

FIG. 3 is a diagram conceptually illustrating the schematic planar structure and action of the position detecting light-receiving element of the optical range-finding sensor according to Embodiment 1 of the present invention.

The light-receiving face of the position detecting light-receiving element 4 is divided into a plurality of light-receiving regions 4r with equal areas. The light-receiving face is divided into, for example, five light-receiving regions 4r, and they are designated as a first light-receiving region 4ra, a second light-receiving region 4rb, a third light-receiving region 4rc, a fourth light-receiving region 4rd and a fifth light-receiving region 4re, starting from the farthest region from the light-emitting element 2. Hereinafter, the first light-receiving region 4ra, the second light-receiving region 4rb, the third light-receiving region 4rc, the fourth light-receiving region 4rd, and the fifth light-receiving region 4re may be referred to simply as "light-receiving regions 4r", where it is unnecessary to distinguish them.

The resistance values R between output terminals 4tf and 4ts of the light-receiving region 4r are different. In other words, the first light-receiving region 4ra has a first resistance value R1, the second light-receiving region 4rb has a second resistance value R2, the third light-receiving region 4rc has a third resistance value R3, the fourth light-receiving region 4rd has a fourth resistance value R4, and the fifth light-receiving region 4re has a fifth resistance value R5. Hereinafter, the first resistance value R1, the second resistance value R2, the third resistance value R3, the fourth resistance value R4 and the fifth resistance value R5 may be referred to simply as "resistance values R", where it is unnecessary to distinguish them.

For example, if it is assumed that the total resistance value Rt of the first resistance value R1, the second resistance value R2, the third resistance value R3, the fourth resistance value R4 and the fifth resistance value R5 is set to 100 (the resistance value between the output terminals 4tf and 4ts), in the present embodiment, the first resistance value R1=2, the second resistance value R2=3, the third resistance value R3=5, the fourth resistance value R4=10, and the fifth resistance value R5=80.

In other words, the resistance values R vary gradually according to the arrangement of the light-receiving region 4r. How the resistance values R vary when set to the above values is shown in the graph of FIG. 3 such that the resistance values R correspond to the arrangement of the light-receiving region 4r (the first light-receiving region 4ra, the second light-receiving region 4rb, the third light-receiving region 4rc, the fourth light-receiving region 4rd and the fifth light-receiving region 4re).

At both ends in the direction of arrangement of the light-receiving region 4r, the position detecting light-receiving element 4 detects a detection current I1 at the output terminal 4tf (which is located farthest from the light-emitting element 2) and a detection current I2 at the output terminal 4ts (which is located closest to the light-emitting element 2) due to the photoelectric conversion effect of the light-receiving region 4r.

Irradiation light Ls emitted from the light-emitting element 2 is collected by the light-emitting side lens 3 and then irradiated to the range-finding object MO. The irradiation light Ls having been irradiated to the range-finding object MO produces reflected light Lr by the range-finding object MO. In the optical range-finding sensor 1, the reflected light Lr reflected by the range-finding object MO is collected by the light-receiving side lens 5, and then a light spot (the position at which the reflected light Lr enters) is formed on the light-receiving region 4r of the position detecting light-receiving element 4.

In other words, if the distance Dis from the optical range-finding sensor 1 to the range-finding object MO changes, the position of the light spot formed on the light light-receiving region 4r changes. Accordingly, the distance Dis can be measured by determining a detection output Ps defined by the formula Detection output Ps Detection current I1/(Detection current I1+Detection current I2) for the detection currents I1 and I2.

When the number of the light-receiving regions 4r (light-receiving faces) is one, with one resistance value R, the detection output Ps is inversely proportional to the distance Dis from the optical range-finding sensor 1 to the range-finding object MO (see FIG. 9 that shows conventional technology). However, in the present embodiment, a plurality of light-receiving regions 4r are provided and the resistance values R of the light-receiving regions 4r are varied gradually as already described.

Specifically, a configuration is employed in which the resistance value R is set higher at the side that is closer to the light-emitting element 2 (e.g., the light-receiving region 4re), that is, the position at which the reflected light Lr enters when the range-finding object MO is located far from the sensor, and the resistance value R, is set lower at the side that is farther from the light-emitting element 2 (e.g., the light-receiving region 4ra), that is the position at which the reflected light Lr enters when the range-finding object MO is located closer to the sensor.

In the position detecting light-receiving element 4, the fifth light-receiving region 4re is closest to the light-emitting element 2, and the first light-receiving region 4ra is farthest from the light-emitting element 2. In other words, as described above, the fifth resistance value R5 (=80)> the fourth resistance value R4 (=10), the fourth resistance value R4 (=10)> the third resistance value R3 (=5), the third resistance value R3 (=5)> the second resistance value R2 (=3), the second resistance value R2 (=3)> the first resistance value R1 (=2).

If a change is made in the distance Dis from the optical range-finding sensor 1 to the range-finding object MO, the amount of change in the position of the light spot on the position detecting light-receiving element 4 (light-receiving region 4r) is greater when the range-finding object MO is located closer to the sensor than when the range-finding object MO is located far away (see FIG. 9 that shows conventional technology).

Accordingly, a configuration is employed in which the resistance value R of a region where the amount of change in the position of the light spot is large is set to be small and the resistance value R of a region where the amount of change in the position of the light spot is small is set to be large (e.g., as described above, the fifth resistance value R5 is set to 80, and the first resistance value R1 is set to 2).

Figure 4:
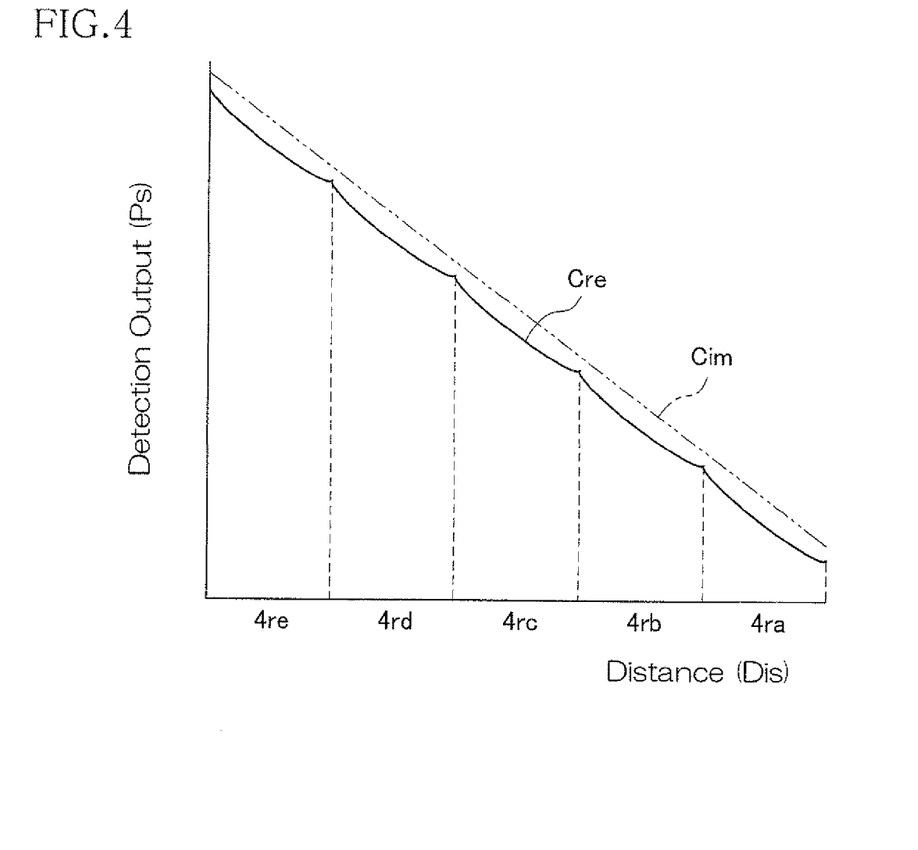
FIG. 4 is a characteristic graph conceptually illustrating a state of detection output versus a distance to a range-finding object detected by the position detecting light-receiving element shown in FIG. 3.

FIG. 4 is a characteristic graph conceptually illustrating the state of detection output versus the distance to the range-finding object detected by the position detecting light-receiving element shown in FIG. 3.

In FIG. 4, the horizontal axis represents the distance Dis from the optical range-finding sensor 1 to the range-finding object MO (i.e., the first light-receiving region 4ra to the fifth light-receiving region 4re serving as the position of the light spot corresponding to the distance Dis), and the vertical axis represents the detection output Ps.

As described above, the position detecting light-receiving element 4 of the optical range-finding sensor 1 of the present embodiment is divided into a plurality of light-receiving regions 4r having equal areas, and the number of the divided light-receiving regions 4r and the resistance values R of the light-receiving regions 4r are set such that the correlation characteristic Cre between the distance Dis to the range-finding object MO and the detection output Ps of the position detecting light-receiving element 4 becomes linear.

In other words, by configuring the position detecting light-receiving element 4 as shown in FIG. 3, "the correlation relationship between the distance Dis and the detection output Ps" of the optical range-finding sensor 1 is made approximately directly proportional, and can be expressed by the linear correlation characteristic Cre. In order to show that the correlation characteristic Cre is linear a straight reference line Cim is also shown in FIG. 4.

Accordingly, even when the distance Dis to the range-finding object MO is relatively large, the change of the detection output Ps to the change of the distance Dis can be increased. In other words, similarly to the case where the distance Dis to the range-finding object MO is short, a linear characteristic can be obtained, and so that even when the spacing between the light-emitting element 2 and the position detecting light-receiving element 4 is reduced, it is possible to measure a long distance Dis when the range-finding object MO is located far away with high accuracy.

In order to measure a relatively long distance Dis to the range-finding object MO without employing the position detecting light-receiving element 4 of the present embodiment (i.e., using the position detecting light-receiving element 104 of conventional technology), it is necessary to increase the spacing between the light-emitting element 102 and the position detecting light-receiving element 104 of the optical range-finding sensor 101, which results in a large optical range-finding sensor. However, by employing the position detecting light-receiving element 4 of the present embodiment, it is possible to achieve range finding characteristics that can measure long distances with high accuracy even when the spacing between the light-emitting element 2 and the position detecting light-receiving element 4 is reduced.

It is preferable that the number of the divided light-receiving faces of the position detecting light-receiving element 4 is 3 or greater. With this, linearity of the linear correlation characteristic Cre can be achieved for at least three distances: long distance, middle distance and short distance, which ensures that the correlation characteristic between the distance Dis to the range-finding object MO and the detection output Ps of the position detecting light-receiving element 4 can be made linear.

Figure 5:
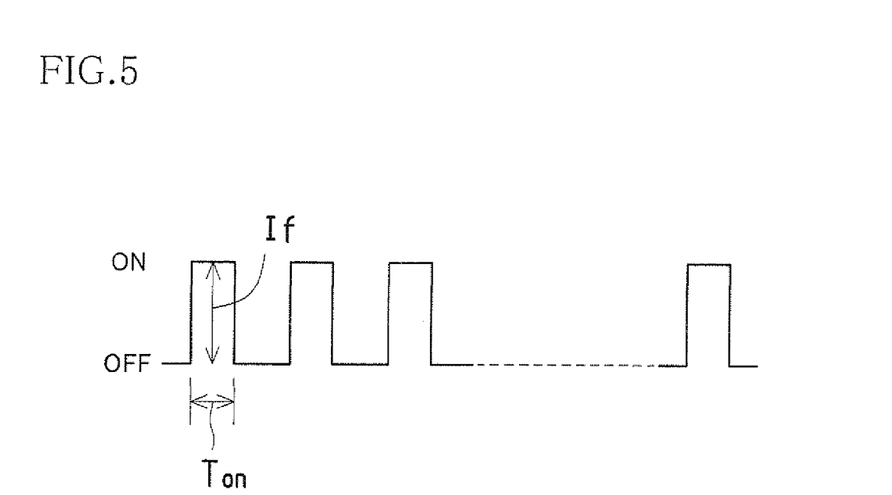
FIG. 5 is a waveform diagram illustrating a driving waveform that drives the light-emitting element of the optical range-finding sensor according to Embodiment 1.

FIG. 5 is a waveform diagram illustrating a driving waveform that drives the light-emitting element of the optical range-finding sensor according to Embodiment 1.

The control processing integrated circuit 7 drives the light-emitting element 2 by pulses only at a predetermined frequency during a predetermined period of time to cause the light-emitting element 2 to perform pulsed light emissions. It also extracts, as an effective signal, the detection output Ps determined by processing the detection currents I1 and I2 that are outputted from the position detecting light-receiving element 4 in synchronization with the timing of the light emissions of the light-emitting element 2, and outputs as the average corresponding to the number of pulse light emissions.

Accordingly, even if ambient light under normal conditions enters the position detecting light-receiving element 4, the influence of the ambient light is eliminated, and highly accurate range finding (detection of the range-finding object MO) can be performed.

When a conventional LED (semiconductor light-emitting diode) is used as the light-emitting element 2, because the semiconductor light-emitting diode radiates irradiation light Ls in all directions from the element, the amount of light in the direction of the range-finding object MO that is necessary for range finding is small. Accordingly, in this case, it is necessary to increase forward current If and light emission time Ton. For example, when the maximum distance of the measurable range is 1.5 m, it is necessary to set the forward current If to 300 mA and the light emission time Ton to 120 µs, to obtain a product of forward current If and light emission time Ton of 36 µs·A.

In contrast, according to the present embodiment, when the maximum distance of the measurable range is 1.5 m, for example, the product (which corresponds the total amount of light necessary for range finding) of forward current If and light emission time Ton when the vertical cavity surface emitting laser is driven by pulses can be set to 5 µsec·A or smaller (this product changes proportionally to the distance squared if the maximum distance changes).

In other words, when the light-emitting element 2 is configured of a vertical cavity surface emitting laser, the directivity of irradiation light Ls can be set to, for example, about 5 to 25 degrees (all radiation beams fall within this range from 5 to 25 degrees), and so that approximately all irradiation light Ls can be collected and used efficiently. As described, the product of forward current If and light emission time Ton can be made small, and as a result, current consumption can be reduced.

As described above, the light-emitting element 2 (vertical cavity surface emitting laser) is driven by pulses, and the control processing integrated circuit 7 is configured to process the detection currents I1 and I2 from the position detecting light-receiving element 4 by adjusting the product of forward current If and light emission time Ton of the vertical cavity surface emitting laser. Accordingly, irradiation light Ls that corresponds to the distance to the range-finding object MO can be emitted, and detectable reflected light Lr can be obtained.

The optical range-finding sensor 1 according to the present embodiment that is configured as described above can be manufactured through the following primary steps: a lead frame preparation step, an element mounting step, a package forming step and a package fitting step.

Specifically, a method for manufacturing an optical range-finding sensor 1 according to the present embodiment is a method for manufacturing an optical range-finding sensor 1 that includes a light-emitting element 2 that emits irradiation light Ls, a light-emitting side lens 3 that collects the irradiation light Ls and irradiates the light to a range-finding object MO, a light-receiving side lens 5 that collects reflected light Lr formed by the irradiation light Ls reflected by the range-finding object MO, a position detecting light-receiving element 4 that receives the collected reflected light Lr and detects a position of the range-finding object MO, and a control processing integrated circuit 7 that controls light emission of the light-emitting element 2 and processes detection currents I1 and I2 of the position detecting light-receiving element 4.

The method involves: a lead frame preparation step of preparing a lead frame 10 for mounting the light-emitting element 2, the position detecting light-receiving element 4 and the control processing integrated circuit 7; an element mounting step of mounting the light-emitting element 2, the position detecting light-receiving element 4 and the control processing integrated circuit 7 onto the lead frame 10; a package forming step of forming a light-transmitting resin sealed package 9 by sealing the light-emitting element 2, the position detecting light-receiving element 4 and the control processing integrated circuit 7 collectively with a light-transmitting sealing resin; and a package fitting step of fitting the light-transmitting resin sealed package 9 to a sensor case 1c that includes the light-emitting side lens 3 and the light-receiving side lens 5.

With this configuration, the light-emitting side lens 3, the light-receiving side lens 5 and the light-transmitting resin sealed package 9 can be positioned and coupled with high accuracy. Accordingly, it is possible to readily form a compact and highly accurate optical range-finding sensor 1.

Embodiment 2

The optical range-finding sensor 1 according to Embodiment 1 can be applied also as an object detection device 21 (see FIG. 6) that detects whether or not there is a range-finding object MO (object to be detected) within a predetermined distance range because the optical range-finding sensor 1 of Embodiment 1 detects the distance from the optical range-finding sensor 1 to a range-finding object MO by detecting reflected light Lr reflected by the range-finding object MO.

In other words, when the optical range-finding sensor 1 of Embodiment 1 is applied, it is possible to obtain a compact object detection device 21 that can detect presence of an object to be detected with high accuracy.

Embodiment 3

A self-cleaning toilet seat according to Embodiment 3 will be described with reference to FIG. 6.

Figure 6:
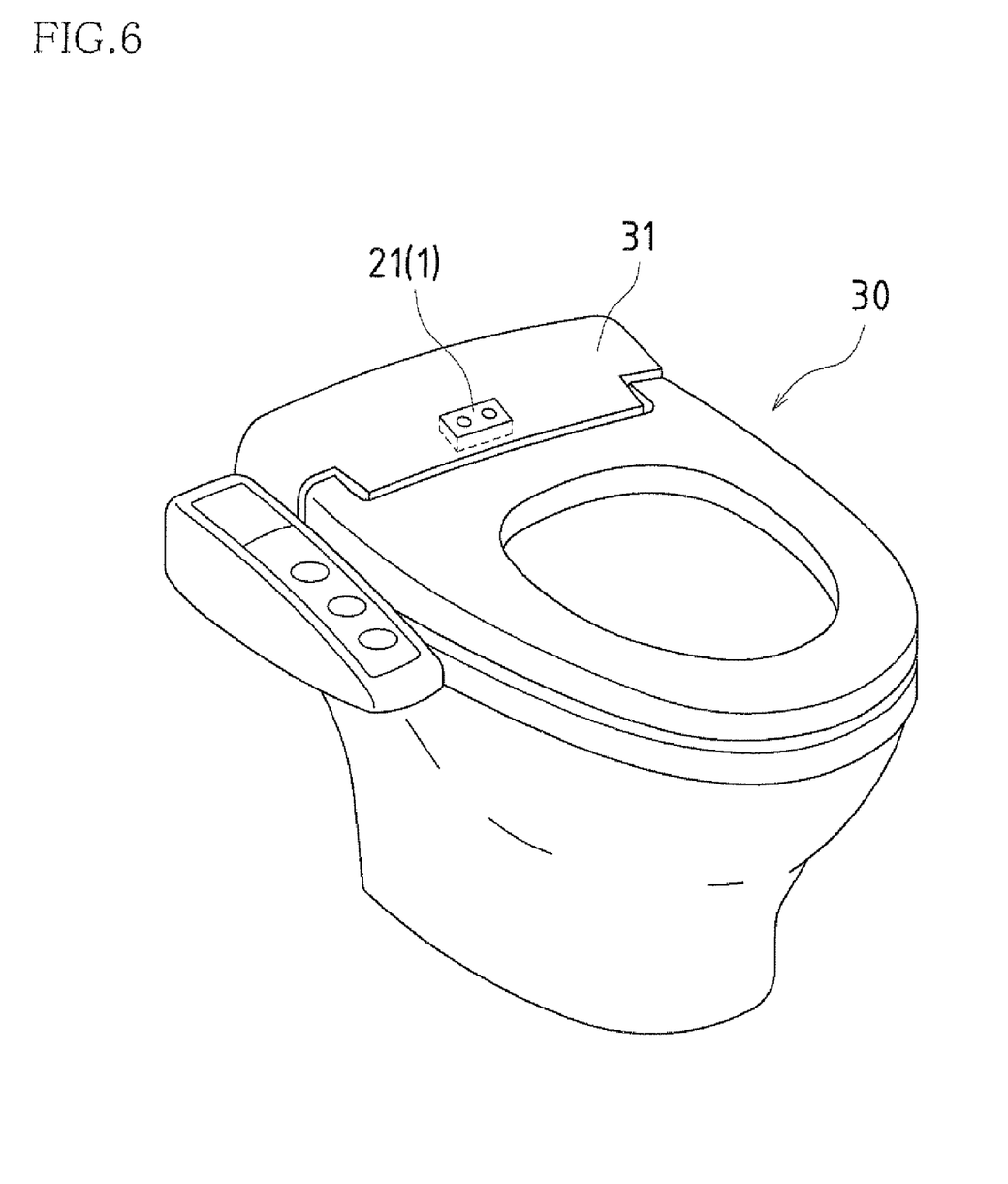
FIG. 6 is a perspective view conceptually illustrating a self-cleaning toilet seat according to Embodiment 3.

FIG. 6 is a perspective view conceptually illustrating a self-cleaning toilet seat according to Embodiment 3 of the present invention.

In the self-cleaning toilet seat 30 according to the present embodiment, the object detection device 21 of Embodiment 2 (the optical range-finding sensor 1 of Embodiment 1) is attached to, for example, a body 31 of the self-cleaning toilet seat 30. The self-cleaning toilet seat 30 (particularly in the case where it is a warm water self-cleaning toilet seat) employs a system that detects whether or not a person is sitting on the seat, and activates a predetermined function (e.g., to heat cleaning water) if it is detected that a person is sitting on the seat.

In other words, the self-cleaning toilet seat 30 according to the present embodiment is a self-cleaning toilet seat that detects a utilization status of the seat using an object detection device 21 and performs a cleaning preparation, wherein the object detection device 21 is the object detection device 21 according to Embodiment 2.

As described in Embodiments 1 and 2, the optical range-finding sensor 1 and the object detection device 21 are compact and highly accurate. Accordingly, the self-cleaning toilet seat 30 according to the present embodiment can function with high accuracy, is easy to use and has a superior design.

The present embodiment may be embodied in various other forms without departing from the gist or essential characteristics thereof. The embodiments disclosed in this application are to be considered in all respects as illustrative and not limiting. The scope of the embodiments are indicated by the appended claims rather than by the foregoing description, and all modifications or changes that come within the meaning and range of equivalency of the claims are intended to be embraced therein.

The invention claimed is:

1. An optical range-finding sensor comprising:
    a light-emitting element that is a vertical cavity surface emitting laser and emits irradiation light;
    a light-emitting side lens that collects the irradiation light and irradiates the light to a range-finding object;
    a light-receiving side lens that collects reflected light of the irradiation light reflected by the range-finding object;
    a position detecting light-receiving element that receives the collected reflected light and detects a position of the range-finding object;
    a control processing integrated circuit that controls light emission of the light-emitting element and process a detection current of the position detecting light-receiving element;
    a sensor case that holds the light-emitting side lens and the light-receiving side lens; and a single light transmitting resin sealed package which is fitted to the sensor case and by which the light-emitting element and completely by the light-transmitting resin, the position detecting light-receiving element and the control processing integrated circuit are sealed collectively, wherein said optical range-finding sensor performs triangulation range finding.

2. The optical range-finding sensor according to claim 1, wherein the light-emitting element, the position detecting light-receiving element and the control processing integrated circuit are mounted on a lead frame.

3. The optical range-finding sensor according to claim 1, wherein the position detecting light-receiving element is divided into a plurality of light-receiving regions having equal areas, and number of the divided light-receiving regions and resistance values of the light-receiving regions are set such that correlation characteristic between a distance to the range-finding object and a detection output of the position detecting light-receiving element becomes linear.

4. The optical range-finding sensor according to claim 3, wherein the number of the divided light-receiving regions is set to 3 or greater.

5. The optical range-finding sensor according to claim 1, wherein a directional angle of the vertical cavity surface emitting laser is set to 5 to 25 degrees.

6. The optical range-finding sensor according to claim 5, wherein a focal distance of the light-emitting side lens is set to 1 to 4 mm.

7. The optical range-finding sensor according to claim 6, wherein a diameter of the light-emitting side lens is set to 0.5 to 2 mm.

8. The optical range-finding sensor according to claim 5, wherein a center of the directional angle is set at a sensor optical axis that is defined by the vertical cavity surface emitting laser and the light-emitting side lens, both of which are positioned on one of the three sides of a triangle set for the triangulation range finding.

9. The optical range-finding sensor according to claim 1, wherein a wavelength of light emitted from the vertical cavity surface emitting laser is a wavelength in an infrared range.

10. The optical range-finding sensor according to claim 1, wherein the vertical cavity surface emitting laser is driven by pulses, and the control processing integrated circuit is configured to process the detection current from the position detecting light-receiving element by adjusting a product of a forward current of the vertical cavity surface emitting laser and emission time.

11. An object detection device that detects presence of an object to be detected using an optical range-finding sensor, wherein the optical range-finding sensor is the optical range-finding sensor according to claim 1.

12. A self-cleaning toilet seat that detects a utilization status of the seat with an object detection device and performs a cleaning preparation, wherein the object detection device is the object detection device according to claim 11.

13. A method for manufacturing an optical range-finding sensor comprising a light-emitting element that is a vertical cavity surface emitting laser and emits irradiation light, a light-emitting side lens that collects the irradiation light and irradiates the light to a range-finding object, a light-receiving side lens that collects reflected light of the irradiation light reflected by the range-finding object, a position detecting light-receiving element that receives the collected reflected light and detects a position of the range-finding object, and a control processing integrated circuit that controls light emission of the light-emitting element and processes a detection current of the position detecting light-receiving element, the method comprising:

lead frame preparation for preparing a lead frame for mounting the light-emitting element, the position detecting light-receiving element and the control processing integrated circuit;

element mounting for mounting the light-emitting element, the position detecting light-receiving element and the control processing integrated circuit on the lead frame;

package forming for forming a light-transmitting resin sealed package by sealing the light-emitting element, the position detecting light-receiving element and the control processing integrated circuit collectively and completely with a light-transmitting sealing resin; and package fitting for fitting the light-transmitting resin sealed package to a sensor case that includes the light-emitting side lens and the light-receiving side lens.

* * * * *